United States Patent [19]

Berg

[11] 4,317,441

[45] Mar. 2, 1982

[54] BROILER APPARATUS

[76] Inventor: Roger M. Berg, 5845 SW. 190th, Aloha, Oreg. 97005

[21] Appl. No.: 67,368

[22] Filed: Aug. 17, 1979

[51] Int. Cl.[3] .................... A47J 37/00; A47J 37/04
[52] U.S. Cl. .................... 126/41 R; 99/390; 99/393
[58] Field of Search ............ 99/390, 339, 389, 427, 99/393; 126/41 R, 39 A–39 N

[56] References Cited

U.S. PATENT DOCUMENTS

| | | | |
|---|---|---|---|
| 2,109,079 | 2/1938 | Ziegler et al. | 158/114 |
| 2,817,331 | 12/1957 | Kaplan et al. | 126/41 R |
| 2,907,267 | 10/1959 | Lindsey | 99/339 |
| 2,941,463 | 6/1960 | Cuia | 99/393 |
| 2,997,941 | 8/1961 | Phelan et al. | 126/41 UX |
| 3,016,817 | 1/1962 | Persinger et al. | 99/339 |
| 3,031,948 | 5/1962 | Lotter | 99/390 |
| 3,052,177 | 9/1962 | Lombardo | 99/390 |
| 3,108,173 | 10/1963 | Barrett et al. | 99/389 |
| 3,421,432 | 1/1969 | Giepen | 99/332 |
| 3,824,915 | 7/1974 | Cupacio | 99/393 |

OTHER PUBLICATIONS

CIP Bulletin #2-Broiling and Benzo (a) Pyrene-Aug. 1978-pp. 1 & 2.
CIP Bulletin #1-Hamburger and Cancer-Jul. 1978-pp. 1 & 2.
TEC-Gas Infra-Red Heaters-pp. 1-26.

*Primary Examiner*—Samuel Scott
*Assistant Examiner*—Weeley S. Ratliff, Jr.
*Attorney, Agent, or Firm*—Klarquist, Sparkman, Campbell, Leigh, Whinston & Dellett

[57] ABSTRACT

A compact broiler for cooking slabs of meat includes generally vertical infrared and preferably gas fired heating elements spaced apart within a housing to define a cooking zone between them. A mouth through the upper surface of the housing provides access to the cooking zone. A special rack suspends a slab of meat within the cooking zone when in one position and when turned 180° to another position suspends the meat in a warming zone above the mouth. The rack retaining mechanism cooperates with the rack to both center the meat within the cooking zone and retain the rack in place. The housing also defines a dripping collecting zone below the heating zone into which a gutter is positioned for capturing drippings from the meat. A liner including a heat shield positioned above the gutter and generally within the dripping collecting zone deflects heat from the heating members away from the gutter to prevent burning of drippings therein. The space between the heat shield and the gutter is ventilated to further contribute to this cooling with air entering this space being directed upwardly through the heating zone and into the warming zone above the mouth. The liner is insertable and removable through the mouth for cleaning purposes.

12 Claims, 5 Drawing Figures

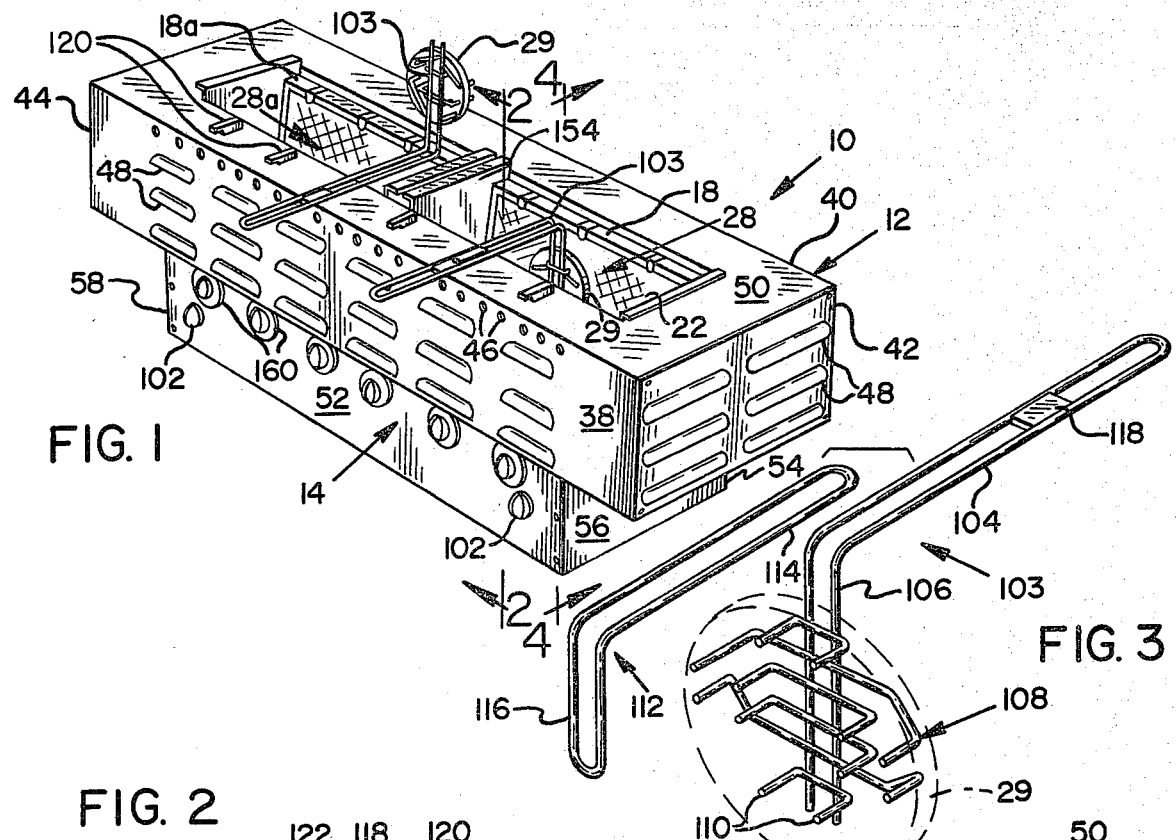
FIG. 1
FIG. 3
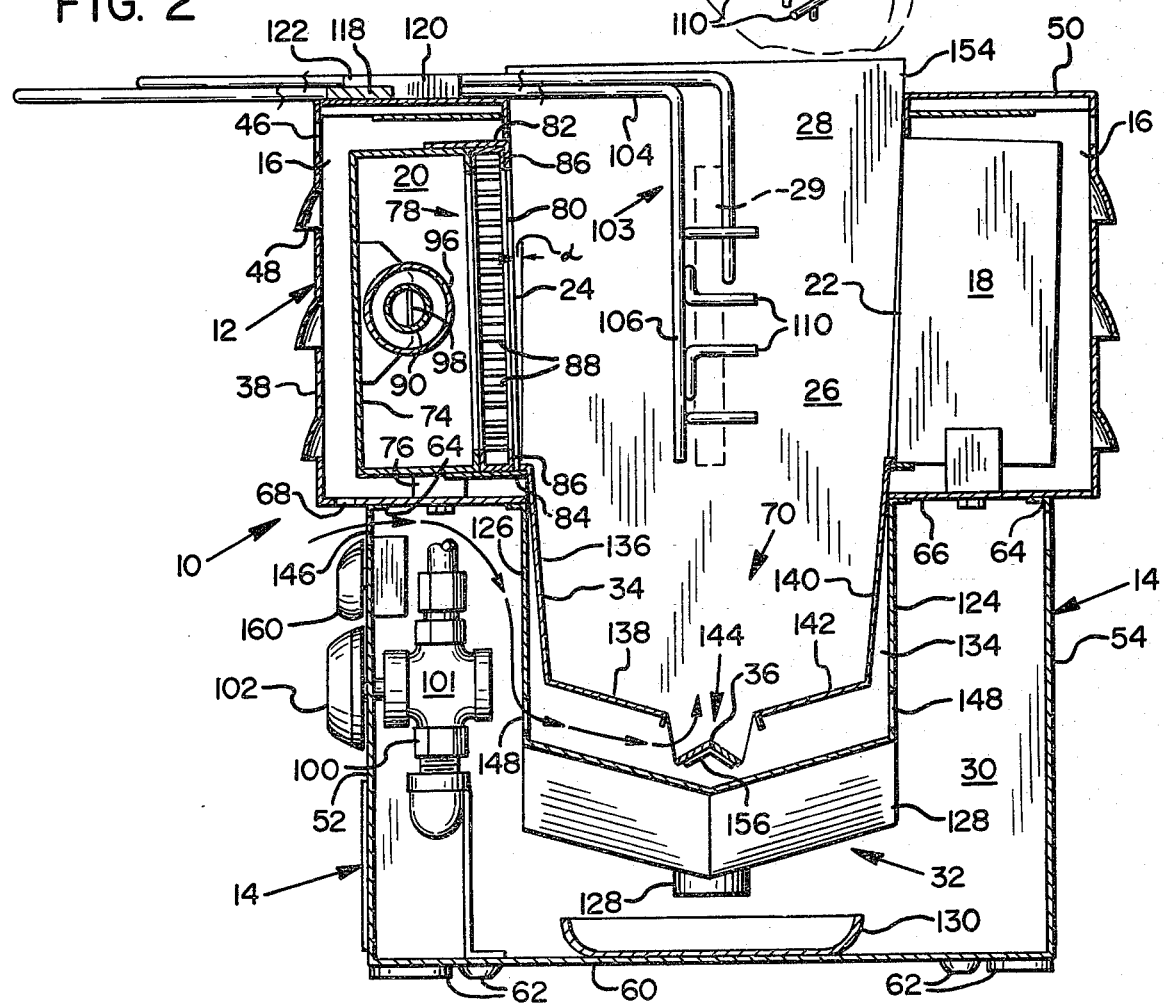
FIG. 2

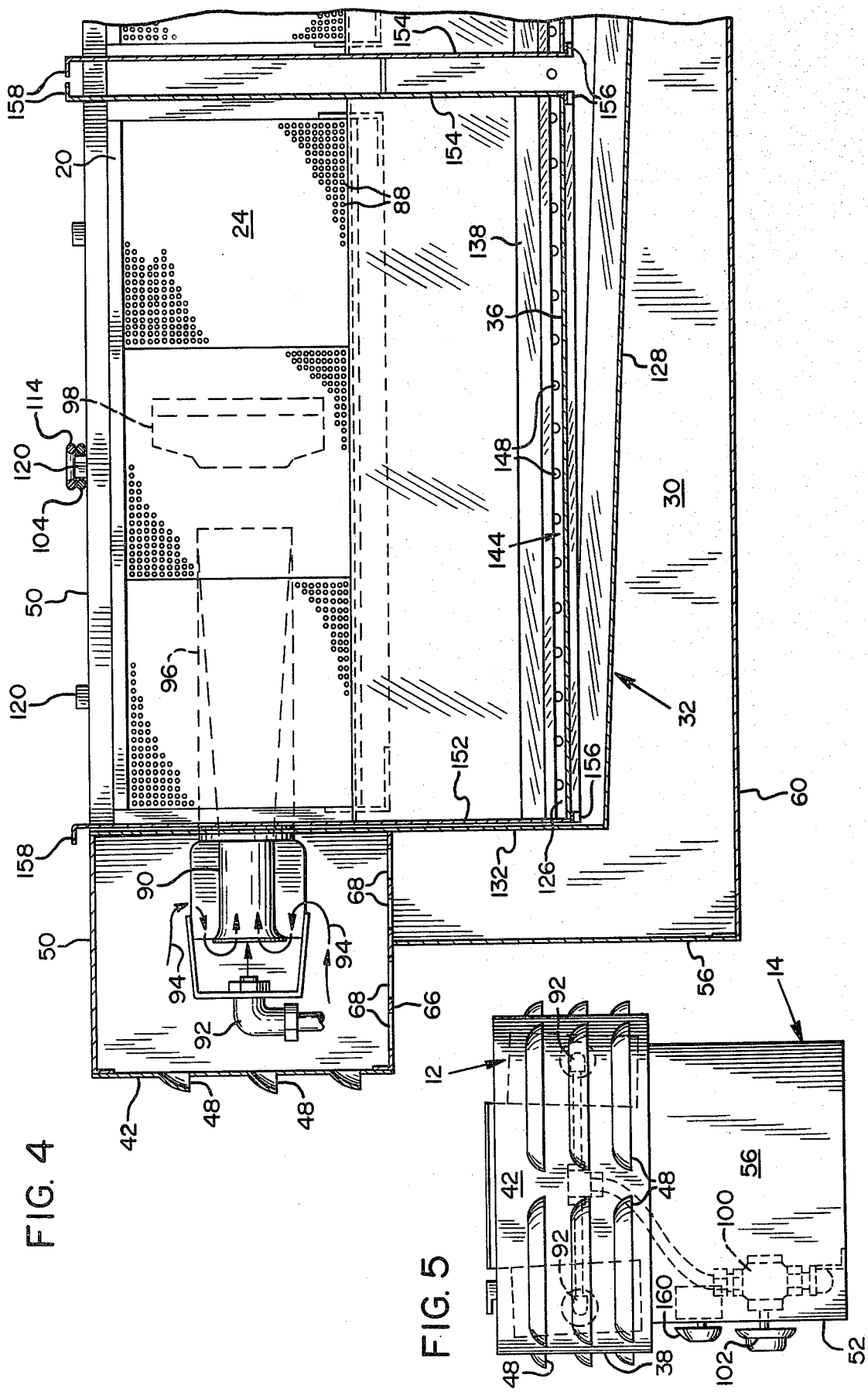

BROILER APPARATUS

BACKGROUND OF THE INVENTION

1. Field of the Invention

The present invention relates to a broiler apparatus for cooking slabs of meat including hamburger patties, and to such a device in which the slabs of meat are suspended generally vertically during cooking.

2. Description of the Prior Art

Various broilers are known which cook vertical slabs of meat. One typical broiler of this type is disclosed in U.S. Pat. No. 2,109,079 of Ziegler. In this broiler, a wire mesh holder carrying a cut of meat is inserted into a vertical slot at the side of the broiler. Flames spewing from heating elements at each side of the slot cook the cut of meat.

However, in common with many other known broilers of this type, drippings from the meat are burned by the flames during cooking. This causes unpleasant smoking and odors. Studies have indicated that burning meat drippings produce benzo(a) pyrene, a recognized carcinogen. Furthermore, a meat holder of the Ziegler type tends to trap bits of charred meat which can become embedded in subsequently cooked meat. That is, a wire mesh holder tends to stick to the meat wherever contact is made, and, particularly when hamburger patties are cooked, this sticking results in bits of meat remaining attached to the holder. If the holder is not cleaned thoroughly before the next slab of meat is cooked, these bits will burn and smoke when a subsequent slab is cooked. Also, some of these bits, will stick to this later cooked slab and impair its taste, as well as carry benzo(a) pyrene. These charred particles can cause indigestion as well as contain the aforementioned substance. In addition, in a meat holder of the type disclosed in Ziegler, a significant amount of metal from the holder is in contact with the surface of the meat. As a result, the surface temperature of the meat is elevated during cooking resulting in the production of potentially cancer causing mutagens. Also, after a cut of meat is removed from the slot, it immediately begins to cool.

Other vertical type meat broilers have been employed in which hamburger patties are rotated during cooking. For example, U.S. Pat. No. 2,907,267 disclosed one such device wherein the patties are rotated about a central axis and U.S. Pat. No. 3,421,432 discloses another type of device in which each patty being cooked is individually and continuously rotated about its separate axis. In addition to complexities and costs of including rotating mechanisms in a broiler, these devices suffer from many of the same drawbacks of the Ziegler type broiler.

Still another broiler is described in U.S. Pat. No. 3,031,948 of Lotter which uses a complex parallelogram mounting structure to support heating elements at an acute angle to the vertical. In addition, a special grill arrangement is required to direct drippings away from the elements. Also, like other known prior art broilers, the meat removed from the Lotter broiler rapidly cools.

SUMMARY OF THE INVENTION

A broiler in accordance with the present invention includes first and second heating members disposed within an upper chamber of a housing. Each heating member has a generally upright heat generating surface spaced apart and facing the heat generating surface of the other member so as to define a cooking zone between them. Slabs of meat are inserted into the cooking zone through a mouth in the housing above this zone. Following cooking, the slabs may be suspended above the mouth and are warmed by heat rising from the heating members.

As another feature of the invention, the housing defines a lower chamber for receiving drippings from slabs of meat as they cook. More specifically, this lower chamber includes a gutter means for collecting the drippings and a heat shielding means for minimizing the amount of heat passing downwardly from the heating members to the gutter means.

As another feature of the invention, a space is provided between the heat shielding means and gutter means and is ventilated to cool drippings in the gutter means and prevent them from burning.

As still another feature of the invention, a special meat supporting member is provided which is easily shifted between a first position in which it supports a slab of meat between the heating members and a second position in which it supports the meat within the warming zone.

As another feature of the invention, the support member is constructed of metal and designed to minimize the amount of contact between the metal and surface of the meat.

As another feature of the invention, a liner which is removable and insertable through the mouth is provided to support the heat shielding means and facilitate cleaning of the broiler.

As a more specific feature of the invention, the heating members comprise gas fired infrared heat generating burners capable of generating cooking temperature within the cooking zone of approximately up to 1500° F.

As a further feature of the invention, the broiler includes multiple cooking units each with a mouth and associated heating members.

It is one object of the invention to provide a broiler which simultaneously cooks both sides of a vertically suspended slab of meat.

A further object of the invention is to provide a broiler which minimizes burning and smoking of drippings from a slab of meat being cooked.

Another object of the invention is to provide a broiler which evenly cooks a slab of meat.

A further object of the invention is to provide a broiler in which multiple slabs of meat can simultaneously be cooked.

A still further object of the invention is to provide a broiler in which slabs of meat can be visually observed during cooking.

Another object of the invention is to provide a broiler in which cooked slabs of meat are kept warmed until served.

Still another object of the invention is to provide a broiler for cooking slabs of meat which are juicier, stay hot longer, shrink less and are more quickly cooked.

A further object of the invention is to provide a broiler which minimizes the production of potentially cancer-causing mutagens during cooking.

A further object of the invention is to provide a broiler which is easy to clean, inexpensive to operate and maintain, compact and attractive, and of simple, but sturdy mechanical construction.

A further object of the invention is to provide a broiler which may be operated with little or no training or prior skills.

The foregoing and other objects, features and advantages of the present invention will become more apparent from the following detailed description which proceeds with reference to the accompanying drawings.

BRIEF DESCRIPTION OF THE DRAWING

In the Drawings:

FIG. 1 is a perspective view of a broiler in accordance with the present invention;

FIG. 2 is a cross sectional view of the broiler taken along lines 2—2 of FIG. 1;

FIG. 3 is a perspective view of one preferred form of a meat supporting member of the invention;

FIG. 4 is a cross sectional view of the broiler taken along lines 4—4 of FIG. 1; and FIG. 5 is an end view of the broiler of FIG. 1.

DETAILED DESCRIPTION OF THE PREFERRED EMBODIMENT

The present invention comprises a device for simultaneously broiling both sides of a slab of meat. In the description, slab of meat refers to relatively thin cuts of meat such as steaks, chops and slices. In addition, the term encompasses patties of ground meat such as a hamburger and other thin meat products such as frankfurters.

With reference to FIGS. 1 and 2, a broiler in accordance with the invention includes a housing 10, preferably of a rigid substance such as sheet metal, having upper and lower rectangular box like enclosure portions 12, 14. Upper enclosure portion 12 defines an interior upper chamber 16 in which respective first and second heating members 18, 20 are disposed. Heating member 18 is positioned along one side of the upper chamber and heating member 20 is positioned along the other side. Heating member 18 includes a generally upright heat generating surface 22 which faces a similar heat generating surface 24 of heating member 20 so that a cooking zone 26 is defined between these surfaces. The upper enclosure 12 defines a mouth 28 above cooking zone 26 through which a slab of meat 29 may be inserted and suspended generally vertically within the cooking zone. In addition, the slab of meat may be suspended in a warming zone above so that it is kept warm by heat escaping upwardly from the cooking zone.

Lower enclosure portion 14 defines a lower or dripping receiving chamber 30. A gutter means such as a gutter 32 is suspended within lower zone 30 to collect drippings from the slab of meat. In addition, a heat shielding means is provided, one form being shown in FIG. 2 with a channel member 34 and capping member 36. As explained more fully below, this heat shielding member deflects heat generated within the cooking zone away from gutter 32 to prevent burning and smoking of drippings within the gutter.

More specifically, upper enclosure portion 12 includes a pair of rectangular vertical side wall sections 38, 40 joined together at their ends by respective vertical end wall sections 42, 44. Ventilating apertures 46 are provided through the upper margins of side wall sections 38, 40. In addition, louvered ventilation openings 48 are provided through the end and side wall sections. A horizontal upper wall section 50 joins the upper edges of the side wall sections 38, 40 and end walls 42, 44 together. Mouth 28 extends centrally through wall section 50 and in its preferred form is defined by this wall section to be rectangular. Also, the upper surface of wall 50 constitutes a level support for a meat supporting device suspending a slab of meat within cooking zone 26.

Lower enclosure portion 14 includes vertical side panels 52, 54 joined together at their ends by vertical end panels 56, 58. A base panel 60 joins the lower edges of panels 52-58. Suitable supports, such as pads 62 secured to the lower surface of base panel 60 provide a slip resistant surface for engaging a countertop or cabinet top which supports the broiler. The upper ends of side panels 52, 54 turn inwardly to provide supporting flanges 64 secured to a planar horizontal dividing pannel 66 which joins the upper edges of panels 52-58 together and also joins the lower edges of wall sections 38-44 together. Panel 66 thus serves to separate upper chamber 16 from lower chamber 30. As best seen in FIGS. 2 and 4, additional ventilating openings 68 are provided through panel 66. Panel 66 defines a central rectangular dripping receiving or lower chamber entrance opening 70 positioned below cooking zone 26. Opening 70 is preferably sized approximately the same size as mouth 28 so that drippings from a suspended slab of meat 29 continuously pass downwardly through opening 70 and enter chamber 30.

Heating members 18, 20 preferably comprise infrared heating elements operable within housing 10 to generate heat within the cooking zone 26 of up to approximately 1500° F. Such intense heat simultaneously and quickly sears both sides of a slab of meat suspended within the cooking zone. Thus, a large portion of the juices from the meat are sealed within the slab, thereby reducing shrinkage experienced in normal broiling and frying methods employed today. This heat causes the slabs to cook quickly with little or no smoking. As a specific example, it has been found that a one-half inch thick, one-third pound, raw hamburger patty is cooked in the broiler to medium doneness in less than three minutes. By medium doneness, it is meant that the patty will have no pink meat showing. Because of the intense heat at the burner surface, and to reduce burning and smoking of the meat, heating generating surfaces 22, 24 are positioned apart a distance substantially larger than the thickness of the slab of meat.

In the illustrated embodiment, there is approximately three inches of space between the sides of the meat slab and the heat generating surfaces. With this spacing, testing has indicated that the surface of the meat slab remains under 200° F. during cooking, even when the slab is left in the cooking zone until it is burnt.

Recent well publicized reports have indicated that burning meat drippings and charred bits of meat contain potentially cancer-causing substances, such as benzo(a)pyrene. However, with this construction of broiler and positioning of heating elements, smoke production by the apparatus and charring of the meat during cooking is very minimal. In addition, studies, such as reported in the July 1, 1978 CIP bulletin, have indicated that cooking methods which cause the surface of a hamburger patty to exceed 300° F. will produce mutagen containing patties in less than ten minutes. In contrast, similar cooking times at lower temperatures do not produce these mutagens. Inasmuch as the broiler apparatus of the present invention cooks slabs of meat quickly with low meat surface temperatures, production of these mutagens should be minimized through use of this broiler.

In the illustrated preferred embodiment, each heating member 18, 20 comprises a gas fired infrared burner. Referring to FIG. 2, each burner includes a housing 74 secured at its ends to mounting brackets 76 which are in turn mounted, as by bolting, to panel 66. Thus, the heating members are rigidly secured within upper chamber 16. An opening 78 is provided through the side wall of housing 74 adjacent to cooking zone 26 and a foraminous ceramic heating element 80 is retained over this opening by upper and lower clips 82, 84 mounted to housing 74. A ceramic felt material 86 is positioned between each clip 82, 84 and the adjacent portion of the ceramic heating element to seal the space between these members. Plural openings 88 through ceramic 80 permit the flow of gas entering housing 74 to the heating surface 24 where it burns.

As best seen in FIG. 4, a tapered venturi tube 90 extends within housing 74 through one of its ends. A gas jet from a supply nozzle 92 enters the venturi tube and burner housing. Gas entering the venturi draws combustion air along the path indicated by arrows 94 into the housing where it is mixed and eventually burns on the heat generating surface. Venturi 90 is surrounded by a cooling jacket 96 which helps prevent the gas-air mixture from igniting until it reaches heat generating surface 22, 24. An inclined baffle 98 distributes the gas-air mixture from the venturi tube evenly throughout the burner to prevent uneven temperatures or hot spots on the heat generating surface.

In one preferred form, three ceramic heating elements of approximately 5"×5" dimensions are arranged edge to edge to form each heat generating surface. One suitable commercially available gas fired infrared heating element is a Model F-30 burner produced by Thermal Engineering Corporation of Columbia, South Carolina. Such heating elements, when positioned within the housing 10, generate cooking temperatures in the cooking zone of up to about 1500° F.

Typically, the upper portions of the heat generating surfaces are somewhat cooler than the upper surfaces. As this could cause uneven cooking of a slab of meat, the heating elements 18, 20 are tilted to compensate for this difference. That is, the lower portion of the heating members are slanted out of vertical so that the lower portion of the heating members are closer together than the upper portion. Letting $\alpha$ (FIG. 2) designate the angle the heating member are tilted away from vertical, it has been determined that even heat is provided if $\alpha$ is established at approximately four degrees.

As shown in FIG. 5, the nozzles 92 of heating members 18, 20 are supplied with gas from a common manifold 100 located within chamber 30. A gas shut-off valve controlled by a handle 102 is provided to turn off the gas supply as desired. A suitable pilot light for each heating member, not shown, is also supplied by manifold 100.

A slab support or rack member 103 is provided for suspending a slab of meat within the cooking zone. In one preferred form, illustrated in FIG. 3, this support member is of a heavy gauge durable metal wire material such as stainless steel, and includes an elongated handle portion 104, a rack supporting section 106 projecting perpendicularly from one end of handle 104, and a rack section 108 for supporting the slab of meat. Rack section 108 includes plural spaced apart prongs 110 projecting perpendicularly outwardly from rack supporting section 106 in a direction away from handle 104. Preferably, the prongs are of sufficient length to impale and hold the slab of meat without supporting section 106 contacting the meat. That is, so that a space exists between section 106 and the adjacent side of the slab. Consequently, meat does not stick to support section 106 and the rack surface in contact with the slab of meat is limited to the minimal surface area of the prongs. As a result, very insignificant amounts of residue from a slab will adhere to the rack during cooking. Therefore, a rack can be used many times between cleaning. Furthermore, the transfer of charred potentially cancer-causing bits of meat from one slab to a subsequently cooked slab is virtually eliminated. Also, because of the minimal contact between the rack and the slab, heat transfer from the rack to the slab is minimized so that the surface temperature of the meat remains at a desirable low level during cooking to thereby limit the production of potentially cancer-causing mutagens.

In addition, removal of a cooked slab of meat, particularly a hamburger, from the rack member is facilitated as a spatula or other cooking utensil can easily be inserted between the slab and supporting section 106 and moved outwardly to remove the slab from the prongs.

When in a first position, with the lower surface of handle portion 104 resting on the upper surface of upper wall 50, rack section 108 and its impaled slab of meat 29 are suspended in the cooking zone 26. Conversely, when the handle is turned over so that the rack support is shifted 180° and extends upwardly, the slab of meat is supported within a warming zone directly above cooking zone 26. As a result, heated air escaping from the cooking zone passes upwardly and keeps the slab of meat warm. This proves advantageous, especially when the broiler is used in a restaurant for cooking multiple orders from a single table. For example, such orders may include a medium rare hamburger and a well done hamburger. After the medium rare hamburger has reached its state of doneness, it may be suspended above the cooking zone merely by turning the handle over where it is warmed while the remaining hamburger is cooked until it is well done.

Handle section 104 also includes a plate-like rack retaining member 118 for abutting a stop 120, secured to the upper surface of wall member 50, when the slab of meat is centered between heating elements 18, 20. Preferably, stop 120 is undercut to form a lip 122 which overlies and engages retention member 118 when the slab of meat is centered within the cooking zone or within the warming zone above the mouth.

An optional angular slab retainer 112 having a first section 114 and a second section 116 extending perpendicularly from section 114 may be placed on top of slab support member 103 as shown in FIG. 2 to prevent a slab of meat from falling off prongs 110.

As mentioned above, gutter 32 collects drippings from a cooking slab of meat. In the illustrated form, gutter 32 includes a vertical gutter side wall 124 projecting downwardly from the edge of panel 66 along one side of opening 70 and a similar gutter side wall 126 extends downwardly from the edge of panel 66 at the opposite side of opening 70. A V-shaped trough member 128 connects the lower edges of walls 124, 126 and is inclined downwardly to carry drippings through an opening 128 at its lowermost end into a drip pan 130 positioned below this opening. As shown in FIG. 4, an end wall plate 132 extends downwardly from the lower surface of panel 50 and interconnects the ends of side walls 124, 126 and trough member 128 to isolate the gutter from the remainder of chamber 30. A similar end plate 130, not shown, is positioned at the opposite end of the gutter.

To prevent drippings in the gutter from smoking, a heat shielding means is included such as channel member 34 and capping member 36 positioned above and spaced apart from the gutter. Channel member 34 includes a first channel side wall section 136 (FIG. 2) supported by a projecting portion of clip 84, such that its upper edge is along the lower edge of heat generating surface 24, and a downwardly inclined base channel section 138 extending from the lower edge of section 136 toward the center of the apparatus. Channel 34 includes a similar channel side wall section 140 and base section 142 extending downwardly from the lower edge of heat generating surface 22. The free ends of the base sections 138, 142 terminate short of one another to define an elongated slot 144 between them. Cap member 36 comprises an inverted V-shaped roof positioned beneath slot 144 to direct drippings from a slab of meat downwardly and into the gutter. Channel member 34 and cap 36 thus cooperate to deflect heat passing downwardly from the cooking zone away from gutter 32.

An end wall plate 152 (FIG. 4) extends downwardly along one end of mouth 28 and joins the adjacent ends of sections 136–142. A similar end wall plate 154 joins the other ends of these sections. A flange 156 projects inwardly from a lower portion of each of these panels and together provide a support for the ends of capping member 36. In addition, end wall plates 152, 154 project upwardly above mouth 18 and include a handle flange portion 158 which can be grasped to lift plates 152, 154, as well as channel member 34 and capping member 36 upwardly for removal through mouth 28. Consequently, these members comprise one form of a removable liner for cooking zone 26. As a result, ready access to gutter 32 is provided to facilitate its cleaning.

Plural cooling openings 146 are provided through an upper marginal portion of lower enclosure side panels 52, 54 and similar openings 148 are provided through gutter side wall sections 126, 124. Consequently, cooling air from outside housing 10 flows through openings 146, 148 and into the space between channel member 34 and gutter member 32. This air cools the drippings within this gutter to minimize their burning and smoking. In addition, the air is funneled upwardly through slot 144, through cooking zone 26 wherein it is warmed, and upwardly through the warming zone above mouth 28 to assure a continued supply of warm air to this zone.

Suitable timers 160 each associated with a particular section of the oppositely facing heating surfaces are provided for timing the amount of time a slab of meat is suspended between the section associated with the timer. When the time set on a timer expires, a bell sounds. These timers make the broiler easy for inexperienced operators to use. That is, it is unnecessary or them to closely and directly monitor the cooking slabs of meat as they need only set the timer and wait for the bell to ring.

The broiler of the invention includes at least one cooking unit of the time described above. However, in the preferred form, housing 10 is sized to contain two such cooking units. That is, upper surface 50 defines an opening that is divided by end wall plate 154 to define the mouth 28 and a second similar mouth 28a. A cooking unit identical to the unit described above is positioned below mouth 28a having heating members 18a, 20a and other features as previously described. However, gutter 32 may extend the full length of housing 10 to act as a common gutter for both units. Of course, additional cooking units, as desired, may be incorporated in the broiler.

Having illustrated and described the principles of my invention with reference to one preferred embodiment, it should be apparent to those skilled in the art that this invention can be modified in arrangement and detail without departing from such principles.

What is claimed is:

1. A broiler for cooking a slab of meat comprising:
   housing means defining an interior chamber;
   first and second heating members positioned within the interior chamber, each such heating member having an upright heat generating surface which faces the heat generating surface of the other heating member, the heat generating surface of the first heating member being spaced from the heat generating surface of the second heating member a distance which is substantially greater than the width of the slab of meat so as to define a cooking zone therebetween;
   said housing means having an upper wall which substantially closes the top of the housing except through a mouth defined by the upper wall above said cooking zone, the mouth being positioned such that a generally vertical slab of meat inserted downwardly through the mouth and into the cooking zone is cooked and a slab of meat suspended above said mouth in a warming zone is warmed by upwardly passing heat from the cooking zone;
   said housing means including a stop member; and
   slap support means for suspending a slab of meat generally vertically within the cooking zone when in a first position and for suspending the slab of meat above the mouth when in a second position, said slab support means including a handle portion positioned so as to abut said stop member when the slab of meat is centered between said heating members to thereby provide an indication that the slab of meat is centered within the cooking zone.

2. A broiler according to claim 1 in which said slab support means includes a rack portion with plural prongs for impaling the slab of meat.

3. A broiler for cooking a slab of meat comprising:
   housing means defining an interior chamber;
   first and second heating members positioned within the interior chamber, each such heating member having an upright heat generating surface which faces the heat generating surface of the other heating member, the heat generating surface of the first heating member being spaced from the heat generating surface of the second heating member a distance which is substantially greater than the width of the slab of meat so as to define a cooking zone therebetween;
   said housing means having a mouth defining portion positioned above said cooking zone such that a generally vertical slab of meat inserted downwardly through the mouth and into the cooking zone is cooked and a slab of meat suspended above said mouth in a warming zone is warmed by upwardly passing heat from the cooking zone;
   said mouth defining portion including a planar generally horizontal exterior rack member supporting surface and including a rack member for supporting the slab of meat, said rack member including an elongated handle, a rack support portion extending perpendicularly outwardly from an end portion of said handle, and a rack member mounted to said rack support portion and including plural prongs extending a direction generally parallel to said handle for impaling the slab of meat, such that when said rack member is in a first position with said handle supported by said rack member supporting surface and said rack support portion extending downwardly through the mouth, said rack member and impaled slab of meat is positioned within the cooking zone;

and such that when said rack member is in a second position with said handle supported by said rack member supporting surface and said rack supporting portion extending upwardly away from the mouth, said rack member and impaled slab of meat is positioned within the warming zone; and including a stop member mounted to said rack member supporting surface, said handle having a stop engaging portion positioned on said handle so as to abut said stop member when said rack member is centered between said heating members to thereby provide an indication that the slab of meat is centered within the cooking zone.

4. A broiler according to claim 3 in which said stop member is undercut to form a retaining lip and said stop engaging portion includes a locking member which engages the lip when said rack member is centered between the heating members to retain the rack member in place.

5. A broiler apparatus according to claim 3 comprising:

a housing which defines an interior chamber having an upper zone and a lower dripping collecting zone; said housing defining at least two mouths each communicating between the upper zone and a warming zone above each mouth and through each of which a slab of meat may be inserted into the upper zone; and first and second spaced apart heating members associated with each mouth, said first and second heating members being disposed within the upper zone along opposite sides of their associated mouth, each said heating member having a substantially vertical heat generating surface with the heat generating surface of each first heating member being spaced from and facing the heat generating surface of the associated second heating member so as to define a cooking zone therebetween;

said rack member comprising means for inserting the slab through a mouth and suspending it within the cooking zone when in a first position such that drippings from the slab of meat continuously flow downwardly into the lower dripping collecting zone; said slab support means also comprising means for suspending the slab within the warming zone above the mouth when in a second position.

6. A broiler according to claim 5 in which said upper wall member defines at least two such mouths.

7. A broiler for cooking a slab of meat comprising:

a housing which defines an interior chamber having an upper zone and a lower dripping collecting zone; said housing including an upper wall member which defines at least one mouth communicating between the upper zone and a warming zone above the mouth and through which a slab of meat may be inserted into the upper zone;

first and second spaced apart heating members disposed within the upper zone along opposite sides of the mouth, each said heating member having a substantially vertical heat generating surface spaced from and facing the heat generating surface of the other heating member so as to define a cooking zone therebetween;

slab support means for inserting the slab through the mouth and suspending it within the cooking zone when in a first position such that drippings from the slab of meat continuously flow downwardly into the lower dripping collecting zone;

said slab support means also comprising means for suspending the slab within the warming zone when in a second position;

said broiler also including gutter means positioned within said dripping collecting zone for receiving drippings from slabs of meat within the cooking zone;

heat shielding means spaced from and positioned above said gutter means and generally within said dripping collecting zone for reducing the passage of heat from said cooking zone to said gutter means, said heat shielding means defining first openings through which drippings from the slab of meat pass into said gutter means; and passageway defining means for defining cooling air passageways communicating from the exterior of said housing to the space between said heat shielding means and said gutter means so as to direct cooling air into such space to thereby cool drippings within said gutter means, whereby air entering such space passes upwardly through the first openings through the heating zone wherein it is warmed, through said mouth and into the warming zone.

8. A broiler according to claim 7 including liner means extending downwardly through the mouth, said liner means including a first and second spaced apart end wall means, one positioned adjacent each end of the mouth, for deflecting heat from said heating members into said cooking zone, said heat shielding means extending between a lower portion of said first and second end wall means.

9. A broiler according to claim 8 in which said liner means is insertable and removable through the mouth.

10. A broiler according to claim 9 in which said liner means includes a handle portion projecting above said mouth to facilitate insertion and removal thereof.

11. A broiler according to claim 7 in which said heating members comprise gas fired infrared burners.

12. A broiler for cooking a slab of meat comprising:

a housing having an upper enclosure portion which defines an upper chamber and a lower enclosure portion which defines a lower chamber, said upper enclosure portion having a planar horizontal upper rack supporting wall which defines an elongated rectangular mouth communicating between the upper chamber and a warming zone above the mouth and through which a slab of meat may be inserted into the upper chamber, said housing also including a planar horizontal panel separating the upper chamber from the lower chamber, said panel defining an elongated rectangular lower chamber entrance opening positioned beneath the mouth;

first and second spaced apart infrared heating members disposed within the upper chamber along opposite sides of the mouth, each said heating member having a substantially vertical elongated heat generating surface spaced from and facing the heat generating surface of the other heating member so as to define a cooking zone therebetween;

slab support means for inserting the slab through the mouth and suspending it within the cooking zone when in a first position such that drippings from the slab of meat continuously flow downwardly into the lower chamber, said slab support means also comprising means for suspending the slab within the warming zone when in a second position;

a liner having first and second generally vertical spaced apart end walls extending downwardly through said mouth and through said lower chamber entrance opening, said first end wall being positioned adjacent to one end of the mouth and said second end wall being positioned adjacent to the other end of the mouth, said liner including heat shielding means positioned generally within said lower chamber for reducing the downward passage of heat from the heating members;

said heat shielding means including a channel member extending between said first and second end walls and defining an elongated slot;

said channel member including first and second upright spaced apart channel side walls, said first channel side wall extending downwardly from the lower edge of one said heat generating surface and said second channel side wall extending downwardly from the lower edge of the other said heat generating surface, a first downwardly inclined channel base member projecting from a lower end portion of said first channel side wall and a second downwardly inclined channel base member projecting from a lower end portion of said second channel side wall, said first and second channel base members extending generally toward one another and defining the slot between their free ends;

gutter means positioned below and spaced apart from said channel member for collecting drippings passing downwardly through the slot; said gutter means comprising a first generally vertical gutter wall section projecting downwardly from said panel along one side of said lower chamber entrance opening, a second generally vertical gutter wall section projecting downwardly from said panel along the other side of said lower chamber entrance opening, and a gutter base section extending between said first and second gutter wall sections;

said heat shielding means also including a cap member extending between said first and second end walls and positioned below the slot and above said gutter base portion to reduce the downward passage of heat from said heating elements through the slot;

said lower enclosure portion defining plural cooling openings between the lower chamber and exterior of the housing and said gutter wall section defining plural gutter wall openings therethrough, such that cooling air entering the cooling openings passes through the gutter wall openings to thereby cool drippings within said gutter means, passes upwardly through the slot and into the cooking zone wherein it is warmed, and passes upwardly through the mouth and through the warming zone.

* * * * *